US008775646B2

(12) United States Patent
Zhou

(10) Patent No.: US 8,775,646 B2
(45) Date of Patent: Jul. 8, 2014

(54) METHOD AND APPARATUS FOR WS-POLICY BASED WEB SERVICE CONTROLLING

(75) Inventor: Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1317 days.

(21) Appl. No.: 11/830,945

(22) Filed: Jul. 31, 2007

(65) Prior Publication Data

US 2008/0046335 A1 Feb. 21, 2008

(30) Foreign Application Priority Data

Aug. 18, 2006 (CN) .......................... 2006 1 0115924

(51) Int. Cl.
*G06F 15/16* (2006.01)
*H04L 12/56* (2006.01)
*H04L 12/24* (2006.01)
*H04L 29/08* (2006.01)

(52) U.S. Cl.
CPC ................. *H04L 47/20* (2013.01); *H04L 47/24* (2013.01); *H04L 41/5003* (2013.01); *H04L 67/2804* (2013.01); *H04L 67/16* (2013.01); *H04L 67/02* (2013.01); *H04L 67/28* (2013.01)
USPC .......................................... 709/229; 709/217

(58) Field of Classification Search
CPC ..... H04L 47/20; H04L 47/24; H04L 41/5003; H04L 67/2804; H04L 67/16; H04L 67/02; H04L 67/28; G06F 9/5027
USPC .................. 709/201–203, 221, 227–229, 217
See application file for complete search history.

(56) References Cited

U.S. PATENT DOCUMENTS

| 6,073,175 | A | 6/2000 | Tavs et al. |
|---|---|---|---|
| 6,466,984 | B1 | 10/2002 | Naveh et al. |
| 6,816,907 | B1 | 11/2004 | Mei et al. |
| 6,968,323 | B1 | 11/2005 | Bansal et al. |
| 6,983,328 | B2 | 1/2006 | Beged-Dov et al. |
| 8,595,287 | B2 * | 11/2013 | Chen et al. ..................... 709/203 |
| 2004/0103339 | A1 * | 5/2004 | Chalasani et al. ................ 714/4 |
| 2005/0198206 | A1 * | 9/2005 | Miller et al. .................. 709/219 |

(Continued)

FOREIGN PATENT DOCUMENTS

CN 1787529 A 6/2009
WO WO 2005/114488 A2 12/2005

OTHER PUBLICATIONS

Wu et al., A Privacy Preserving Enhanced Trust Building Mechanism for Web Services, Third Annual Conference on Privacy, Security and Trust (PST'05), New Brunswick, Canada, Oct. 2005.*

*Primary Examiner* — Oleg Survillo
(74) *Attorney, Agent, or Firm* — Jordan IP Law, LLC

(57) ABSTRACT

Apparatus and method for WS-Policy based web service controlling. The apparatus includes: a service policy repository for storing a plurality of Web Service policies; a service policy agent for receiving a request for a Web Service policy from a service consumer and for obtaining conditioning information that influences the Web Service policy; and a service policy conditioner for selecting corresponding Web Service policy from the service policy repository in accordance with the conditioning information. The service policy agent sends the Web Service policy to the service consumer. The Web Service policy-based service differentiation method decouples the service differentiation mechanism from the service provision and service invocation mechanism and can provide policy support in accordance with other nonfunctional conditions besides service functions.

12 Claims, 3 Drawing Sheets

(56) References Cited

U.S. PATENT DOCUMENTS

| | | |
|---|---|---|
| 2005/0240422 A1* | 10/2005 | Doyle et al. ............ 705/1 |
| 2006/0041636 A1* | 2/2006 | Ballinger et al. ............ 709/218 |
| 2007/0005777 A1* | 1/2007 | Fremantle et al. ............ 709/228 |
| 2007/0150934 A1* | 6/2007 | Fiszman et al. ............ 726/1 |
| 2007/0162567 A1* | 7/2007 | Ding ............ 709/219 |
| 2007/0169199 A1* | 7/2007 | Quinnell et al. ............ 726/25 |
| 2008/0168150 A1* | 7/2008 | Chen et al. ............ 709/206 |
| 2010/0306374 A1* | 12/2010 | Yacoby et al. ............ 709/224 |
| 2012/0246270 A1* | 9/2012 | Han et al. ............ 709/217 |
| 2014/0053235 A1* | 2/2014 | Lerner et al. ............ 726/1 |

* cited by examiner

METHOD AND APPARATUS FOR WS-POLICY BASED WEB SERVICE CONTROLLING

FIELD OF THE INVENTION

The present invention relates to the field of Web Services (WS) and, more particularly, to a method and an apparatus for WS-Policy based web service controlling.

BACKGROUND

Web service is a distributed computing environment, whose basic idea is to implement distributed software development, software engineering and software using on the Internet by using open standard techniques. Here, "service" means all kinds of software distributed on the Internet, and either an entity user or an individual user can invoke service software existing on the Internet by using Web service techniques to constitute their own application software in accordance with service needs. Application software of different entities can invoke each other with Web service techniques to support applications, such as e-business, client relationship model, etc. and so do the application software of entities and clients. Although the meaning of Web service is totally different from that of common Web that can only provide data service, the adopted protocol and interface thereof still fall into Web techniques that have been put into extensive use.

The basic technique of Web service lies in XML that is an extensible markup language defined by W3C to describe data. Different from Hypertext Markup Language (HTML), XML merely describes data contents per se without involving display of data, and thus it can be used to describe any content in broad sense. In Web service, it is XML that is used to describe remote invocation operations and implementation results thereof. The description is loaded in Simple Object Access Protocol (SOAP), and SOAP messages are usually transferred in the most common HTTP. Since XML text description is irrelevant to implementation, platforms that adopt different operating systems and different programming languages can interact with each other via Web service. The distribution and description of Web Service per se is also implemented using XML.

Web Service policy describes the requirements and abilities of a web service in its interactions with other web services or consumers, which is important to Service Level Agreement (SLA). The Web Services Policy (WS-Policy) Framework defined by IBM, BEA, Microsoft, etc., is the de facto standard for Web Service policy. It provides a general purpose model and corresponding syntax to describe the policies of a Web service. WS policy defines a set of base constructs that can be used and extended by other Web services specifications to describe a broad range of service requirements and capabilities. Based on WS policy, a standard set has been defined for different perspectives of system including WS-RM policy, WS-Security policy, WS-Atomic transactions, WS policy assertions, etc. Users can also define policy languages based on WS policy and related standards for their requests. Web Service policy is a standard protocol that can be easily extended and can be used to perform other functions.

In general, a Web service provider will disclose a policy to present conditions for service provisioning. The service provider defines and publishes a set of options in policy statements in different ways, such as via a service registration center (e.g. UDDI) or embedded in WSDL. A service consumer can use the policy to decide whether and how to use the service. Further, the service consumer can select any substitute option in the policy statements because each substitute option is an effective configuration capable of interacting with the service. Generally, the service consumer or other policy enforcement point choose an option in the policy statements and aggregate it with local policy statement to generate the effective policy that will be enforced during communication with the service provider.

Such a mechanism provides flexibility for the provider who provides client side application selection service. In this mechanism, after the service provider exposes all its acceptable options, the choice is actually in the requester's hand, and the service provider cannot control the service requester to choose which option. Thus, a certain policy option might be used by many requesters, while other options are seldom or hardly chosen, so that the load of the service provider is not balanced. For example, after the resource of a certain policy option is exhausted, if requesters still request the service provider to provide service in accordance with the policy option, then the service provider cannot provide service in accordance with the option. Meanwhile, if a requester requests other service, the service provider has resources to provide service in accordance with the option. Therefore, there is a need for a mechanism to enable a service provider to dynamically decide the disclosure of service policy in accordance with conditions, so as to prevent service consumers from blindly choosing service policy.

Another demand for Web service is to provide service differentiation. Efforts have been made by industry and academy to enable Web service differentiation. However, these methods are derived by extending IP differentiated service, and focus on service implementation itself and network transportation layer, such as a Web server.

SUMMARY

According to an aspect of the present invention, an apparatus is provided for WS-Policy based web service controlling, comprising: a service policy repository for storing a plurality of Web Service policies; a service policy agent for receiving a request for a Web Service policy from a service consumer and for obtaining conditioning information that influences the Web Service policy; and a service policy conditioner for selecting corresponding Web Service policy from the service policy repository in accordance with the conditioning information, wherein the service policy agent sends the Web Service policy to the service consumer.

According to another aspect of the present invention, provided is a Web service provider including the above apparatus for WS-Policy based web service controlling.

According to a further aspect of the present invention, a Web Service policy registration center is provided including the above apparatus for WS-Policy based web service controlling.

According to a still further aspect of the present invention, a method for WS-Policy based web service controlling is provided, comprising the steps of: receiving a request for a Web Service policy from a service consumer; in response to the request, obtaining conditioning information that influences the service; selecting a Web Service policy corresponding to the conditioning information from a policy repository; and sending the Web Service policy to the service consumer.

According to a still further aspect of the present invention, machine-readable storage means is provided on which a computer program is stored, the computer program having a plurality of machine-executable code parts to enable the machine to perform the steps of: receiving a request for a Web Service policy from a service consumer; in response to the request, obtaining conditioning information that influences the service; selecting a Web Service policy corresponding to the conditioning information from a policy repository; and send the Web Service policy to the service consumer.

BRIEF DESCRIPTION ON THE DRAWINGS

The accompanying drawings illustrate embodiments of the invention and, together with the description, serve to explain the principles of the invention. In the drawings.

Like elements and components are designated with like numerals throughout the drawings, and repeated description thereof is omitted.

DETAILED DESCRIPTION

Figure 1:
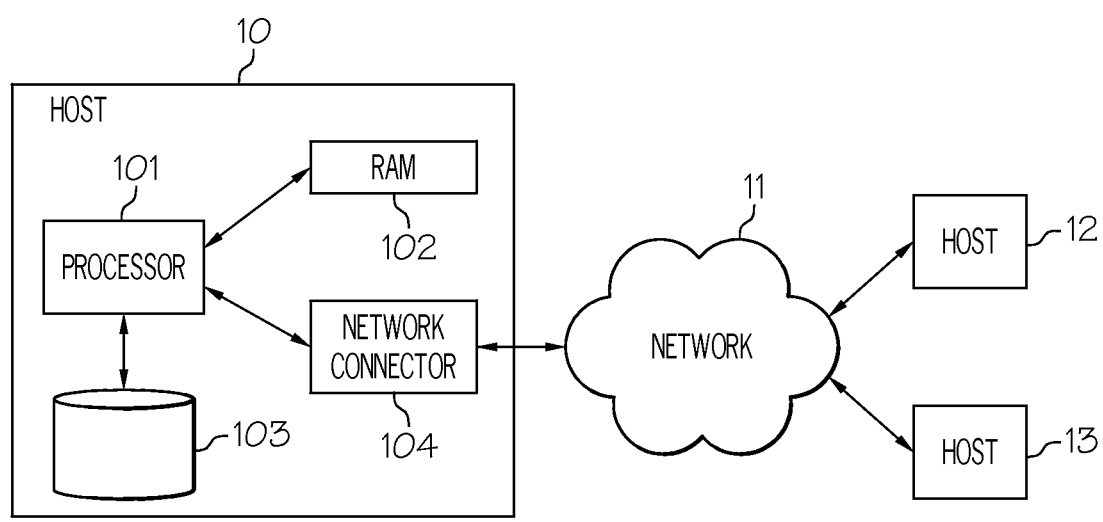
FIG. 1 is a schematic view of a data processing environment in which preferred embodiments of the present invention can be applied advantageously.

FIG. 1 is a block diagram of a data processing environment in which preferred embodiments of the present invention can be applied advantageously. In FIG. 1, a client/server data processing host 10 is connected to client/server data processing hosts 12 and 13 via a network 11, e.g. the Internet. For example, a Web client program is run on host 10, and Web service on host 12 is accessed via a gateway server on host 13. Client/server 10 has a processor 101 for running a program controlling the operation of client/server 10, a RAM volatile storage element 102, a nonvolatile memory 103, and a network connector 104 for connecting to network 11 to communicate with other clients/servers 12 and 13.

In the present invention, a preferred way of describing service policy is to adopt Service Policy Profile (SPP) mechanism. SPP defines a set of Web Service policies and describes the abilities and requirements of a Web service. Generally speaking, SPP can be denoted in the form of XML file, an SPP file describes a set of service policies, including e.g. RM (reliable message), TX (transaction), RT (response time) and Sec (security) policy parameters to represent reliable message, transaction, response time and security policy parameters, respectively. Another set of service policies can be described using another SPP file. Before a service consumer activates a Web service, he(she) can request SPP and activate the Web service in accordance with the policy in SPP. SPP can be stored in any form. For example, SPP can be a separate XML file. Those skilled in the art should understand that using SPP to describe service policy is merely an embodiment, and other forms, such as text files and other forms agreed between the service provider and the service consumer, can also be directly used to describe service policy.

Further, service policy can also be embedded in the service metadata describing service and is obtained while the service consumer requests the service metadata. For example, according to Web Service Policy Attachment (WS-Policy Attachment), Web Service policy can be attached to a service registration center (e.g. UDDI) entity to be associated with Web service body. Also, Web Service policy can be embedded in WSDL, XSD or DTD metadata. When the service consumer requests a metadata file, then the metadata file in which Web Service policy is embedded is sent to the service consumer. In this manner, the service consumer obtains service policy while obtaining the metadata file, and he(she) can activate the Web service in accordance with the service policy and the metadata.

If Web Service policy is attached to a service registration center (e.g. UDDI) entity, a service policy or metadata controller 210 can be a part of the service registration center (e.g. UDDI), whose function is to screen Web Service policy. If Web Service policy is embedded in WSDL, XSD or DTD, service policy or metadata controller 210 can be a part of Web service supporting WS-Discovery.

Figure 2:
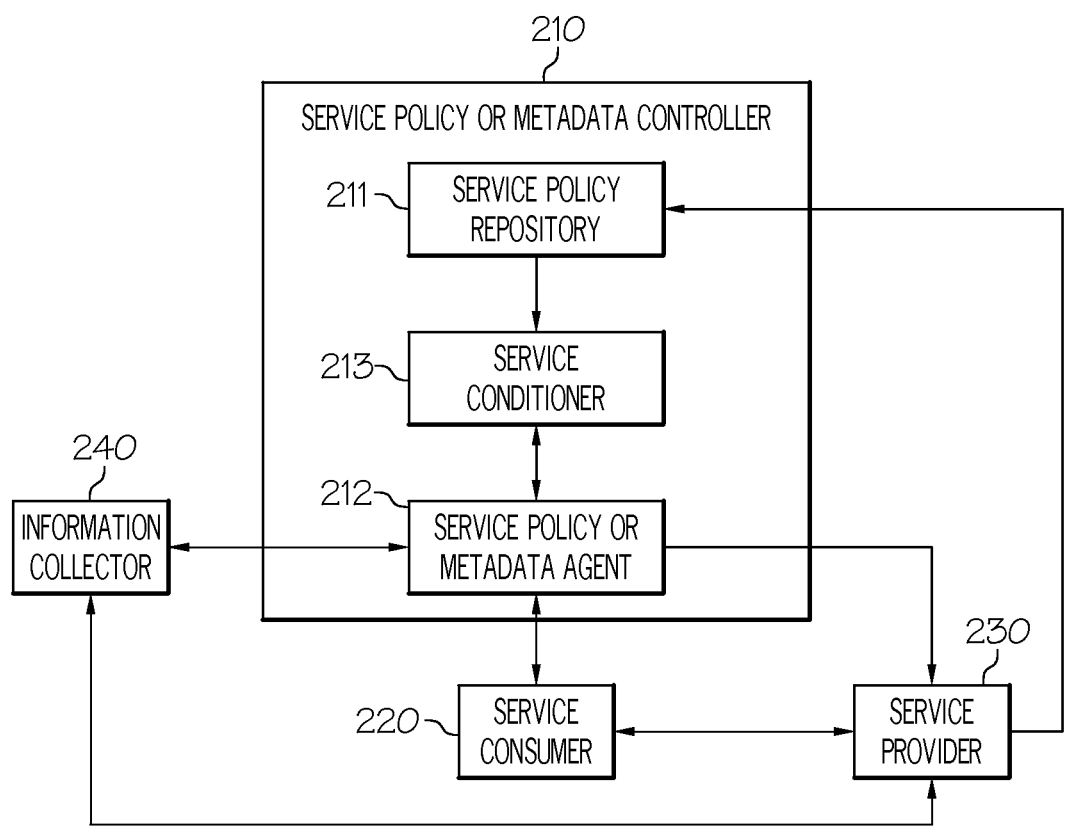
FIG. 2 is a block diagram of an apparatus for WS-Policy based web service controlling according to an embodiment of the present invention.

FIG. 2 is a block diagram of an apparatus for WS-Policy based web service controlling according to an embodiment of the present invention. First, the present invention is illustrated in detail in a situation in which the service consumer requests separate Service Policy Profile (SPP). In FIG. 2, service policy or metadata controller 210 contains a service policy repository 211, a service policy or metadata agent 212, and a policy conditioner 213. Service policy or metadata controller 210 can be a separate server, which receives a request for SPP from a service consumer 220 and sends an SPP file to service consumer 220 via a protocol, such as HTTP and FTP.

First, during the development and deployment of Web service, a service provider 230 defines a set of plural service policies that are allowable to the Web service and service policy selection rules according to service conditioning plan, and stores the set in service policy repository 211. Service policy selection rules define one or more conditions for selecting respective service policies, and when service conditioning information conforms to the one or more conditions, corresponding service policy is selected. Service policy selection rules can be described in many forms, among which XML file is the most common. Further, other describing forms, like condition format, can also be used. The present invention is not limited to a specific describing form. For example, when service policy selection rules are user identity, including common user and VIP user, and service policy uses SPP file, then for a service consumer which is a common user according to SLA, the following SPP1 is selected:

SPP1 = {
    RM = false
    TX = false
    RT = 5 seconds
    Sec = non
}

This means that for such kinds of service consumer, the service does not support reliable messaging and transaction features. The maximum response time is five seconds without security support.

For a service consumer which is a VIP user according to SLA, the following SPP2 is selected:

SPP2 = {
    RM = true
    TX = AtomicTransaction
    RT = 1 second
    Sec = X509
}

This means that for such kind of service consumer, the service supports reliable messaging and atomic transaction. The maximum response time is one second with X509-based security support.

Additionally, when service policy is described using SPP file, and service policy selection rules are load threshold or period of time, then for Web service whose load does not exceed a threshold or which is in a certain idle period of time (e.g. 22:00-6:00), the following SPP3 is applied:

```
SPP3 = {
          RT = 1 second
        }
```

This means that all service consumers get relatively quick response time in this case. On the contrary, for Web service whose load exceeds a threshold or which is in a certain busy period of time (e.g. 9:00-21:00), the following SPP4 is applied:

```
SPP4 ={
          RT = 5 seconds
        }
```

This means that in this case, system resources are not enough to implement relatively good service, and all service consumers get relatively slow response time.

There are various policy selection rules. In additional to user identity selection rule, period of time selection rule, and load threshold selection rule mentioned in the foregoing, those skilled in the art can further define other selection rule on demand, examples of which will be presented below.

There can be many ways of storing service policy and service policy selection rules in service policy repository 211, which can be in the form of database, e.g. XML database, or the way of common database plus an explaining application, or the way of file matching. The present invention is not limited to a specific storage way.

Hereinafter, suppose service policy is described using SPP file for the purpose of convenient description.

Service policy or metadata agent 212 receives a request for SPP from service consumer 220 that can request SPP to service policy or metadata agent 212 in its different phases. For example, service consumer 220 can request SPP to service policy or metadata agent 212 during development, deployment, and runtime.

In response to the request of service consumer 220, service policy or metadata agent 212 further request conditioning information that can influence service policy to the information collector 240. There can be many kinds of conditioning information that can influence service policy, including transaction processing mode, security measure, language, and accessibilities of service consumer 220 and/or service provider 230, such as identity, language, version, and region of the service consumer and encrypting way, transaction processing mode, load state, response time, and period of time of the service provider. It should be understood that the present invention is not limited to the above conditioning information, and those of ordinary skill in the art can use any conditioning information of the service consumer or service provider that can influence the service. Meanwhile, the conditioning information serves as a basis for service policy selection rules.

It should be understood that information collector 240 can request the conditioning information from the service consumer, the service provider or other monitoring server. Information collector 240 can be any application, program module, or server that can obtain the above conditioning information. For example, information collector 240 can be an authentication server. During authentication, service policy or metadata agent 212 can obtain an identifier of service consumer 220 from the authentication server. Or, information collector 240 can be a Web service monitoring system, which monitors resource utilization status of the Web service provider and which provides information of the service provider, such as encrypting way, transaction processing mode, load state, and service response time. Further, information collector 240 can also be a system managing Service Level Agreement (SLA). It can provide any condition used for differentiating service in accordance with SLA. Techniques of acquiring conditioning information and how to monitor the Web service provider are well known, and the present invention is not limited to any specific way of monitoring Web service state and providing which kind of state information of Web service.

It should be understood that to obtain conditioning information from information collector 240 is an optional way. When service consumer 220 sends a request to service policy or metadata agent 212, service policy or metadata agent 212 can obtain much differentiated service information of service consumer 220. For example, service policy or metadata agent 212 can obtain service ID, WS-Addressing endpoint, message ID, language, version, IP address, region of service consumer 220 and other message. According to the above messages, service differentiation can be provided for service consumer 220. At the same time, the conditioning information serves as a basis for service policy selection rules.

Information collector 240 collects service conditioning information and sends the information to service policy or metadata agent 212.

Upon receipt of the service conditioning information, service policy or metadata agent 212 sends to policy conditioner 213 ID of the requested service, ID of the service consumer, message ID, and the service conditioning information.

Policy conditioner 213 obtains corresponding policy selection rule and SPP from the policy repository, selects corresponding SPP for service consumer 220 based on service conditioning information and policy selection rule, and sends the corresponding SPP to service policy or metadata agent 212.

Policy conditioner 213 returns the selected SPP to service policy or metadata agent 212 that returns the SPP to service consumer 220. In this manner, service differentiation based on Web Service policy is realized.

Under service policy selection rules based on period of time and load threshold, if the load of service provider 230 does not exceed a threshold or is in a relatively idle period of time, policy conditioner 213 selects SPP3 with relatively good quality of service, so that all service consumers can select better quality of service. If the load of service provider 230 exceeds a threshold or is in a relatively busy period of time, policy conditioner 213 provides SPP4 with relatively bad quality of service for the service consumer. All service consumers can only use relatively bad quality of service, whereas the service provider can control the use of its resources.

It should be understood that to select corresponding SPP for the service consumer based on service conditioning information and policy selection rules is feasible to those of ordinary skill in the art. For example, it can be set among policy selection rules to select a certain SPP1 when a piece of service conditioning information is within a threshold range. Once it is determined whether the current service conditioning information is in the range, it can be decided whether to use the SPP1. The logic determination can be implemented by various programming methods. Detailed description about it is omitted here.

Alternatively, upon receipt of corresponding SPP of the service consumer, service policy or metadata agent 212 sends service consumer ID and the SPP to service provider 230 for preparation. Another possibility is that when service is invoked, service provider 230 requests the SPP which is provided by service policy or metadata agent 212 for service consumer 220. In response to the request, service policy or metadata agent 212 sends the SPP to the service provider.

Hereinafter, the embodiment as shown in FIG. 2 will be illustrated in a situation in which the service consumer requests metadata containing service policy.

Service policy or metadata agent 212 receives a request for metadata containing service policy from service consumer 220. In response to the request of service consumer 220, service policy or metadata agent 212 further makes a request to information conditioner 240 for conditioning information that can influence service policy. Information collector 240 collects service conditioning information and sends the information to service policy or metadata agent 212. Upon receipt of the service conditioning information, service policy or metadata agent 212 sends service ID and the service conditioning information to policy conditioner 213. Policy conditioner 213 obtains corresponding policy selection rules and SPP from the policy repository, selects SPP for service consumer 220 based on the service conditioning information and the policy selection rules, and sends the SPP to service policy or metadata agent 212. Upon receipt of the corresponding SPP, service policy or metadata agent 212 embeds policy statements contained in the SPP into the subject of object metadata file and sends the metadata file to service consumer 220. According to the metadata file, service consumer 220 activates Web service with the rule specified in service policy.

Figure 3:
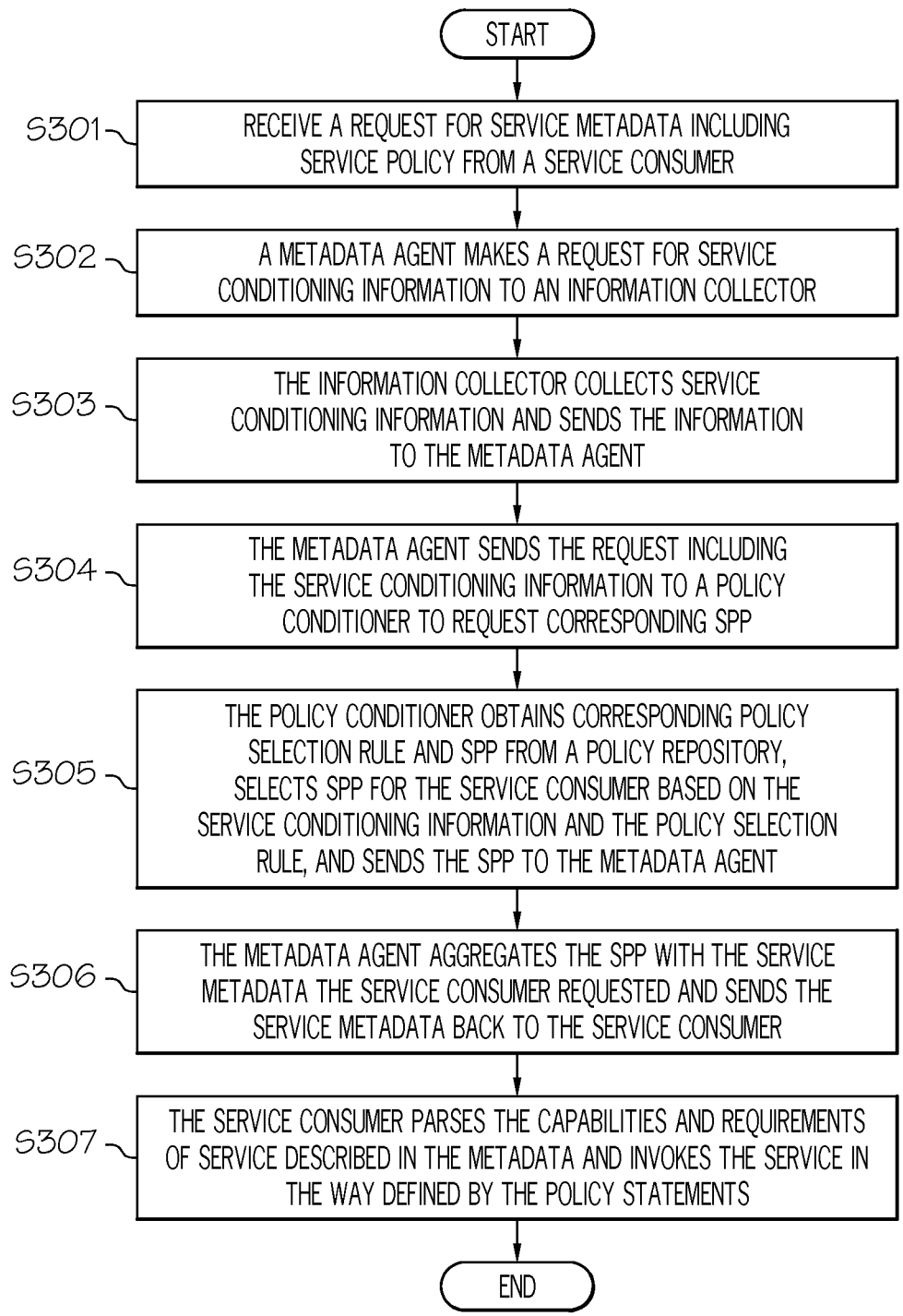
FIG. 3 is a flowchart of a method for WS-Policy based web service controlling according to an embodiment of the present invention.

FIG. 3 is a flowchart of method for WS-Policy based web service controlling according to an embodiment of the present invention. In step S301, a request for service metadata containing service policy is received from a service consumer. If service policy or metadata controller 210 is a part of a service registration center (e.g. UDDI), the service consumer can request the metadata agent for metadata which describes Web service and in which service policy is embedded during development, deployment, or runtime; if service policy or metadata controller 210 is a part of a service provider providing service, the service consumer can request the metadata agent for metadata which describes Web service and in which service policy is embedded during runtime only.

In step S302, responsive to the service consumer's request, the metadata agent makes a request to an information collector for service conditioning information. In step S303, the information collector collects service conditioning information associated with providing of Web service. The conditioning information can be requested by the information collector to the service consumer, the service provider, or other monitoring server. The information collector returns the conditioning information to the metadata agent. In step S304, the metadata agent sends a request containing the service conditioning information to a service conditioner to request corresponding SPP.

In step S305, a service conditioner obtains corresponding policy selection rule and SPP from a policy repository, selects SPP for the service consumer based on the service conditioning information and the policy selection rule, and sends the SPP to the metadata agent. To select SPP can be implemented by matching the conditioning information with the selection rule.

In step S306, the metadata agent aggregates the SPP with the service metadata which the service consumer has requested, and sends the service metadata back to the service consumer.

In step S307, the service consumer parses the capabilities and requirements of service described in the metadata, then invokes the service in the way defined by the policy statements, so that service differentiation based on service policy is realized.

Further, in step S306, the metadata agent can also sends ID of the service consumer and corresponding SPP to the service provider for preparation of service provisioning. Or, when the service is invoked, the service provider makes a request to the metadata agent, and the metadata agent sends corresponding SPP to the service provider for preparation of service provisioning.

According to the present invention, the policy controller only provides service consumer with part of policies which conform to current conditioning conditions from policies which the service provider supports. However, service policy statements contained in SPP are still selectable. That is to say, SPP still can contain a plurality of policy substitute options. Service consumer 220 at least supports one of policy substitute options and requests Web service in accordance with the supported policy.

Since the service provider sets conditions for disclosure of service policy, only part of policies conforming to conditions are provided to the service consumer and service policy is basically controlled by the service provider. This changes the policy controlling mechanism in the prior art, that is, the service provider publishes all supported service policies and the service consumer decides any one of service substitute options.

In the present invention, the service provider provides different service policies for different service consumers in accordance with different conditions, so that service differentiation is realized. Compared with existing service differentiation, service differentiation of the present invention does not need to add additional information to the header. The policy based web service controlling of the present invention is transparent to client end and can realize service differentiation without the need for client end code support. The present invention can work with existing application based on WS-Policy without the need for changing client side application, so that the development of client end becomes simple.

Further, service differentiation in the prior art is implemented based on the binding and collaboration of client and server. The present invention decouples the service differentiation mechanism from the service provisioning and service invocation mechanism, so that it is more flexible to deploy a new service differentiation mechanism.

Further, service differentiation in the prior art only takes such as QoS of performance, into consideration and does not involve other aspects of nonfunctional requirements, such as transaction, security, language, specification version, and accessibilities. In the present invention, the service provider controls service policy in accordance with all kinds of service conditioning information, so that it can provide policy support based on other nonfunctional conditions besides service functions.

Further, the service provider can control the utilization of resources by dynamically controlling the disclosure of service policy, to prevent unbalance of the resources utilization ratio due to blind selection of service substitute options by service consumers.

The present invention has been described in conjunction with the embodiments that are merely illustrative and not limiting. Those of ordinary skill in the art can make various changes or modifications on this basis. For example, the above policy agent accesses the information collector to obtain conditioning information and then sends the conditioning information to the policy conditioner. Another possible way is that the policy conditioner accesses the information collector to obtain conditioning information.

The disclosed method of the present invention can be implemented in software, hardware or a combination of software and hardware. The hardware part can be implemented using a dedicated logic, and the software part can be stored in a memory and executed by a proper instruction executing system, such as a microprocessor, a personal computer (PC) or a large computer.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadcast interpretation so as to encompass all such modifications and equivalent structures and functions.

What is claimed is:

1. A method for WS-Policy based web service controlling, comprising:
    storing, in a service policy repository, a plurality of Web Service policies;
    executing, with a processor, the Web Service policies;
    receiving, with a service policy agent, a request for service metadata including a Web Service policy from a service consumer, wherein the service policy agent obtains differentiated service information from the request, and obtains conditioning information that influences the Web Service policy from at least one of the service consumer, a service provider, and a monitoring server via an information collector; and
    selecting, with a service policy conditioner, a corresponding Web Service policy from the service policy repository in accordance with the conditioning information;
    wherein the service policy agent embeds the selected Web Service policy in the metadata, and sends the metadata in which the selected corresponding Web Service policy is embedded to the service consumer,
    wherein the conditioning information includes at least one of: transaction processing mode, language, and region of the service consumer or load state and response time of the service provider,
    wherein the service consumer invokes a Web service in accordance with at least a part of the Web Service policy and the metadata, and
    wherein the metadata comprises WSDL, XSD or DTD metadata.

2. The method of claim 1, wherein the service policy agent further sends the selected Web Service policy to the service provider.

3. The method of claim 1, wherein the service policy agent further receives a request of the service provider and sends the selected Web Service policy to the service provider.

4. An apparatus for WS-Policy based web service controlling, comprising:
    a service policy repository storing a plurality of Web Service policies;
    a processor configured to execute the Web Service policies;
    a service policy agent configured to receive a request for service metadata including a Web Service policy from a service consumer, wherein the service policy agent obtains differentiated service information from the request, and configured to obtain conditioning information that influences the Web Service policy from at least one of the service consumer, a service provider, and a monitoring server via an information collector; and
    a service policy conditioner configured to select a corresponding Web Service policy from the service policy repository in accordance with the conditioning information; wherein the service policy agent is configured to embed the selected Web Service policy in the metadata, and send the metadata in which the selected corresponding Web Service policy is embedded to the service consumer,
    wherein the conditioning information includes at least one of: transaction processing mode, language, and region of the service consumer or load state and response time of the service provider,
    wherein the service consumer invokes a Web service in accordance with at least a part of the Web Service policy and the metadata, and
    wherein the metadata comprises WSDL, XSD or DTD metadata.

5. The apparatus in accordance with claim 4, wherein the service policy agent further sends the selected Web Service policy to the service provider.

6. The apparatus in accordance with claim 4, wherein the service policy agent further receives a request of the service provider and sends the selected Web Service policy to the service provider.

7. The apparatus in accordance with claim 4, wherein the apparatus is part of a Web Service provider.

8. The apparatus in accordance with claim 4, wherein the apparatus is part of a service registration center (UDDI).

9. The apparatus in accordance with claim 8, wherein the Web Service policy is a policy file attached to a service registration center entity.

10. A non-transitory machine-readable storage medium on which a computer program is stored, the computer program having machine-executable code parts, which when executed by a processor, cause the machine to perform the steps of:
    a) receiving a request for service metadata including a Web Service policy from a service consumer, and obtaining differentiated service information from the request;
    b) in response to the request, obtaining conditioning information that influences a service from at least one of the service consumer, a service provider, and a monitoring server via an information collector;
    c) selecting a Web Service policy corresponding to the conditioning information from a service policy repository;
    d) embedding the selected Web Service policy in the metadata;
    e) sending the metadata in which the Web Service policy is embedded to the service consumer,
    wherein the conditioning information includes at least one of: transaction processing mode, language, and region of the service consumer or load state and response time of the service provider,
    wherein the service consumer invokes a Web service in accordance with at least a part of the Web Service policy and the metadata, and
    wherein the metadata comprises WSDL, XSD or DTD metadata.

11. The medium in accordance with claim 10, further comprising: sending the selected Web Service policy to the service provider.

12. The medium in accordance with claim 10, further comprising: responsive to a request of the service provider, sending the selected Web Service policy to the service provider.

\* \* \* \* \*